(12) United States Patent
Cernasov (10) Patent No.: US 7,646,419 B2
(45) Date of Patent: Jan. 12, 2010

(54) MULTIBAND CAMERA SYSTEM

(75) Inventor: Andrei Cernasov, Ringwood, NJ (US)

(73) Assignee: Honeywell International Inc., Morristown, NJ (US)

(*) Notice: Subject to any disclaimer, the term of this patent is extended or adjusted under 35 U.S.C. 154(b) by 558 days.

(21) Appl. No.: 11/591,633

(22) Filed: Nov. 2, 2006

(65) Prior Publication Data

US 2008/0106727 A1 May 8, 2008

(51) Int. Cl.
*H04N 5/225* (2006.01)
(52) U.S. Cl. .................. 348/344; 348/343
(58) Field of Classification Search .......... 348/343, 348/344
See application file for complete search history.

(56) References Cited

U.S. PATENT DOCUMENTS

| | | | |
|---|---|---|---|
| 4,672,439 A * | 6/1987 | Florence et al. ............. 348/164 |
| 5,686,889 A | 11/1997 | Hillis | |
| 6,347,010 B1 | 2/2002 | Chen et al. | |
| 6,410,930 B1 * | 6/2002 | Revelli et al. .......... 250/559.38 |
| 6,477,326 B1 | 11/2002 | Partynski et al. | |
| 6,694,094 B2 | 2/2004 | Partynski et al. | |
| 7,202,793 B2 * | 4/2007 | Grace et al. ................. 340/576 |
| 7,531,774 B2 * | 5/2009 | Paxman et al. ........... 250/201.9 |
| 2002/0015536 A1 | 2/2002 | Warren et al. | |
| 2002/0140822 A1 | 10/2002 | Kahn et al. | |

2003/0174315 A1 9/2003 Byren et al.

FOREIGN PATENT DOCUMENTS

GB 2389989 A 12/2003
WO WO 2006015906 A 2/2006

OTHER PUBLICATIONS

European Patent Office "European Search Report," mailed Jul. 23, 2009, for European Patent Application No. 07 11 9833, filed Nov. 11, 2007.

* cited by examiner

*Primary Examiner*—Timothy J Henn
*Assistant Examiner*—Gary C Vieaux
(74) *Attorney, Agent, or Firm*—Ingrassia Fisher & Lorenz, P.C.

(57) ABSTRACT

A multiband camera system includes: a first sensor for generating a first object image and a first alignment image in a first frequency band; a second sensor for generating a second object image and a second alignment image in a second frequency band; and an internal alignment assembly. A splitter directs radiation in the first frequency band from the object to the first sensor to form the first object image, directs radiation in the second frequency band from the object to the second sensor to form the second object image, directs radiation in the first frequency band from the internal alignment assembly to the first sensor to form the first alignment image, and directs radiation in the second frequency band from the internal alignment assembly to the second sensor to form the second alignment image. The first alignment image and the second alignment image establish a reference for aligning the first and second object images.

20 Claims, 6 Drawing Sheets

FIG. 5B  Tilted View

FIG. 5A  Top View

FIG. 6

MULTIBAND CAMERA SYSTEM

BACKGROUND OF THE INVENTION

1. Field of the Invention

The present invention relates to camera systems, and more particularly to a multiband camera system having multiple image sensors and an internal alignment assembly.

2. Description of the Related Art

For many military and civilian applications, such as industrial machine vision, laser-beam profiling, military imaging, etc., there is a need for simultaneous capture of high resolution images in multiple frequency bands, such as, for example, shortwave infrared and visible frequencies, thermal and visible frequencies, etc. However multiple band cameras are difficult to produce.

One dual band unit camera is capable of imaging visible and shortwave infrared (SWIR) wavelengths. The key element in this dual band unit camera is a backside-illuminated 320×240-pixel InGaAs photodiode array, with a thinned InP substrate. Visible light is typically absorbed by the InP substrate because of its 920 nm cutoff. However, a thinned InP substrate can let more visible light reach the InGaAs absorption layer. The thinned InP substrate is just thick enough to passivate the InGaAs surface and provide a contact layer for other camera parts. However, such processing is expensive and inefficient. Moreover, the detection band in such cameras is limited by the nature of the sensor material. For example, InGaAs is only sensitive to 400-1700 nm band.

Figure 1:
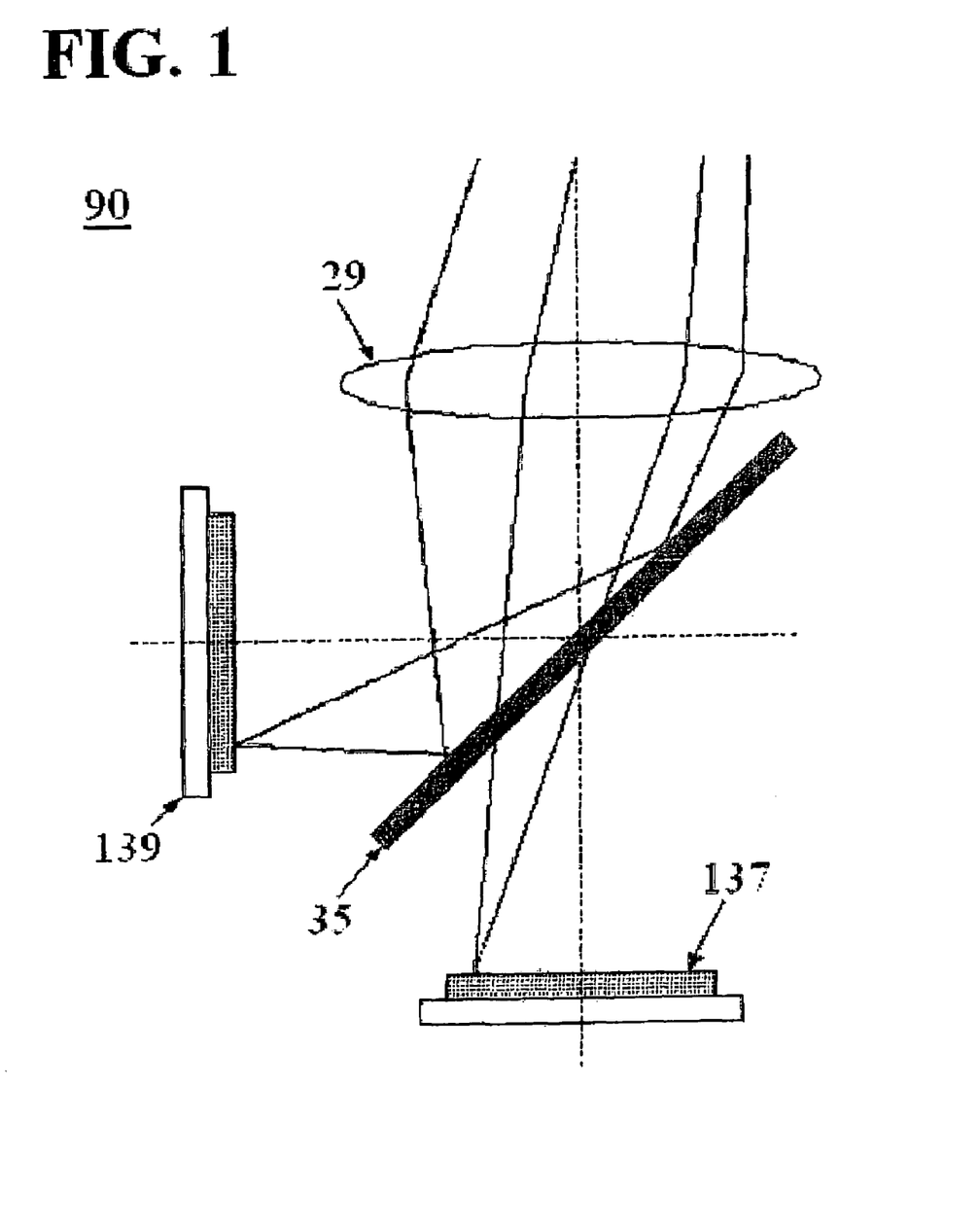
FIG. 1 is a general illustration representing a known multiband camera system using separate image sensors to generate images in multiple frequency bands.

Another known multiband imaging technique, generally represented by FIG. 1, utilizes a multiband camera system 90 including: an optical front end system 29; a first sensor 137, which is optimized for a first frequency band; a second sensor 139, which is optimized for a second frequency band; and a splitter device 35. The splitter device 35 directs some rays from an external object to the first sensor 137 to form a first object image, and directs other rays from the external object to the second sensor 139 to form a second object image. Thus, the multiband camera system 90 images an external object on both the first sensor 137 and the second sensor 139 to obtain images in different frequency bands. Although this arrangement produces images in multiple frequency bands, operating conditions such as vibrations, thermal conditions etc. may cause relative movement between the multiple image sensors. This relative movement results in misalignment when the images are overlaid.

Disclosed embodiments of this application address these drawbacks of known multiband camera systems by providing a multiband camera system having separate sensors for generating images in different frequency bands and an internal alignment assembly that enables accurate image registration even when the sensors are subject to relative motion. In one embodiment, image readout from the multiple image sensors is adjusted based on an internal alignment assembly to automatically align the multiple images while minimizing processing overhead.

SUMMARY OF THE INVENTION

In one aspect, the present invention is a multiband camera system that includes: a first sensor for generating a first object image and a first alignment image in a first frequency band; a second sensor for generating a second object image and a second alignment image in a second frequency band; and an internal alignment assembly. A splitter directs radiation in the first frequency band from the object to the first sensor to form the first object image, directs radiation in the second frequency band from the object to the second sensor to form the second object image, directs radiation in the first frequency band from the internal alignment assembly to the first sensor to form the first alignment image, and directs radiation in the second frequency band from the internal alignment assembly to the second sensor to form the second alignment image. The first alignment image and the second alignment image establish a reference for aligning the first and second object images.

According to another aspect, the present invention is a method for multiband operation of a camera system. The method comprises directing radiation in a first frequency band from an object and an internal alignment assembly to a first sensor; directing radiation in a second frequency band from the object and the internal alignment assembly to a second sensor; generating a first object image and a first alignment image in the first frequency band using the first sensor; and generating a second object image and a second alignment image in the second frequency band using the second sensor. The method aligns the first and second object images using the first and second alignment images.

BRIEF DESCRIPTION OF THE DRAWINGS

Further aspects and advantages of the present invention will become apparent upon reading the following detailed description in conjunction with the accompanying drawings. These drawings do not limit the scope of the present invention. In these drawings, similar elements are referred to using similar reference numbers, wherein.

DETAILED DESCRIPTION

Figure 2:
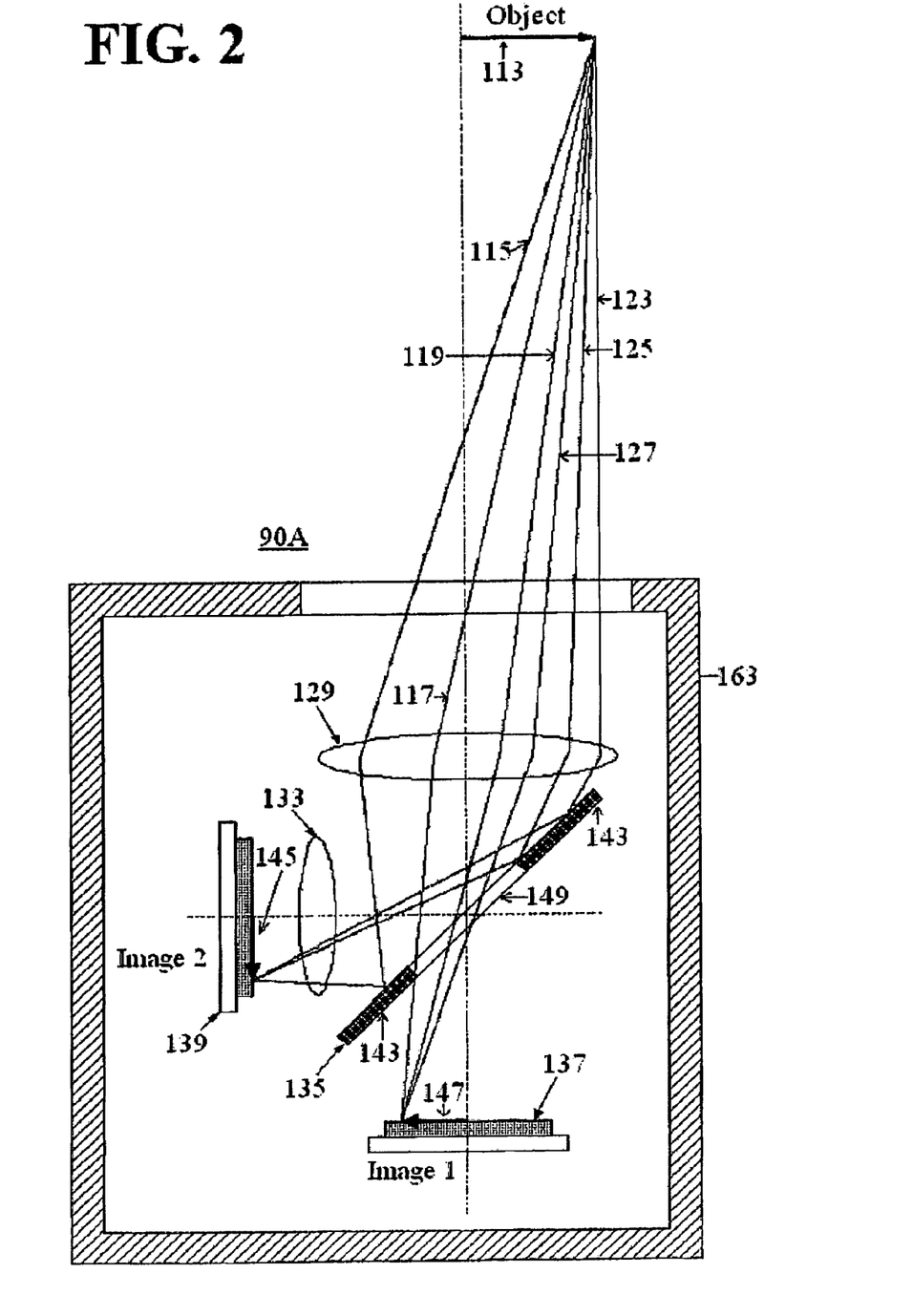
FIG. 2 illustrates a configuration for a multiband camera system to which principles of the present invention may be applied to achieve automatic image alignment.

Aspects of the invention are more specifically set forth in the accompanying description with reference to the appended figures. FIG. 2 illustrates a configuration for a multiband camera system 90A to which principles of the present invention may be applied to enable image alignment. As shown in FIG. 2, the multiband camera system 90A according to this embodiment includes: an optical front end system 129; an optional corrective optics system 133; an image splitter device 135; a first sensor 137; a second sensor 139; and a multiband camera system frame 163.

The first sensor 137 and second sensor 139 are separate image sensors, each optimized for use in a target band. Two sensors are shown in FIG. 2, but more than two sensors may be present. Target bands for the first sensor 137 and the second sensor 139 are frequency bands from the electromagnetic spectrum. Two optical paths exist in multiband camera system 90A, corresponding to the first sensor 137 and to the second sensor 139. The optical front end system 129 is common to both optical paths.

An external object 113 is imaged by multiband camera system 90A as shown in FIG. 2. A plurality of rays, of which rays 115, 117, 119, 123, 125, and 127 are shown, originate at object 113. Rays enter the multiband camera system 90A by passing through an opening in multiband camera system frame 163. As seen in FIG. 2, the object rays first pass through common optical front end system 129 before reaching the image splitter device 135. The optical front end system 129 includes optical elements such as lenses, filters, etc., that change properties and directions of incoming rays. Rays 117, 119, and 127 emerge from optical front end system 129, pass without changing direction through a transparent section 149 of the image splitter device 135, and form a first object image 147 on the first sensor 137.

Rays 115, 123, and 125 also emerge from optical front end system 129, and strike a reflective section 143 of the image splitter device 135. Rays 115, 123, and 125 are reflected by the reflective section 143, and their direction is changed so that they pass through optional corrective optics system 133. Corrective optics system 133 includes optical elements that change properties of rays and optical paths, and may improve spatial spread of rays, chromatic variation, etc. Rays 115, 123, and 125 emerge from corrective optics system 133 and form a second object image 145 on the second sensor 139. The first object image 147 and the second object image 145 may be further overlaid by electronic means according to a user-preferred algorithm. A multiband camera system as illustrated in FIG. 2 may use DSP techniques to align images from the first sensor 137 and the second sensor 139. Such DSP alignment techniques, however, have latency and significant processing overhead. An embodiment of the present invention avoids these drawbacks in a manner described below.

Optical materials may exhibit a significant amount of dispersion, as they may have different indices of refraction at different frequencies. Hence, the lengths of the optical paths for the two optical paths to the first and second sensors 137 and 139 may be different for different frequency bands, especially after rays for both optical paths pass through the optical front end system 129. For some applications, the optional corrective optics system 133 may be used to balance the optical paths from the object 113 to be imaged, to the various sensors (137, 139).

The image splitter device 135 can be a dichroic splitter, an annular mirror, a dichroic annular mirror, etc. The purpose of the image splitter device 135 is to split the incoming object image (generated by rays from object 113) into separate images for separate frequency bands, and direct the separate images towards sensors 137 and 139. The sensors 137 and 139 are each sensitive to at least one of frequency bands processed by multiband camera system 90A. For example, the first sensor 137 may be sensitive to a first frequency band, while second sensor 139 may be sensitive to a second frequency band. Frequencies of rays 117, 119, and 127 within the first frequency band emerge from transparent section 149 of the image splitter device 135, and are sensed by the first sensor 137 to form the first object image 147. Frequencies of rays 115, 123, and 125 in the second frequency band are sensed by the second sensor 139 to form the second object image 145.

When the frequency bands are wide and have large interband separations (such as the visible and IR frequency bands), an embodiment of the present invention uses a reflective annular mirror, which provides efficient image splitting for the two frequency bands. By changing the ratio between the radius of the pass through hole transparent region 149 and the radius of the mirror region 143, the amount of light reaching each of the two sensors can be changed. The sensitivity of each of the two sensors also influences the amount of light required to form an image.

Figure 3:
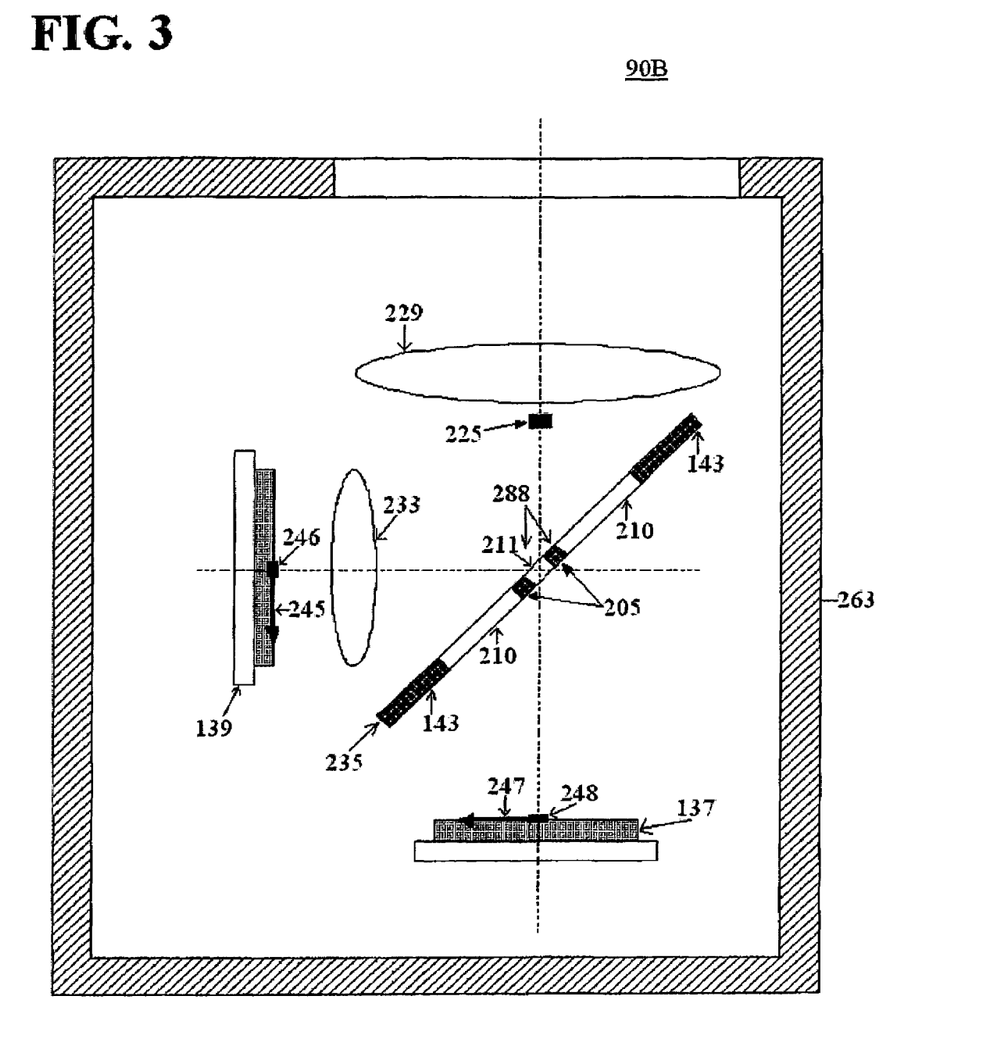
FIG. 3 illustrates a configuration for a multiband camera system including an internal alignment system according to an embodiment of the present invention.

FIG. 3 illustrates a configuration for a multiband camera system 90B including an internal alignment system according to an embodiment of the present invention. As shown in FIG. 3, the multiband camera system 90B according to this embodiment includes: an optical front end system 229; an optional corrective optics system 233; an image splitter device 235 including a transparent region 210 and a reflective region 143; an alignment image splitter 288 including a transparent region 211 and a reflective region 205; a first sensor 137; a second sensor 139; an internal alignment assembly 225; and a multiband camera system frame 263.

The multiband camera system 90B illustrated in FIG. 3 enables alignment of images formed on the first sensor 137 and the second sensor 139, such that object images from the multiple sensors can be accurately overlaid. Alignment is achieved using the integral alignment assembly 225 and the alignment image splitter 288. The first sensor 137 and the second sensor 139 have been described above with reference to FIG. 2. Two sensors are shown in FIG. 3, but more than two sensors may be present.

Two optical paths exist in multiband camera system 90B, corresponding to the first sensor 137 and the second sensor 139. The optical front end 229 is common to both optical paths. Optical front end 229 includes optical elements such as lenses, filters, etc., that change properties and directions of incoming rays. The function of optical front end system 229 is similar to the function of optical front end system 129 described at FIG. 2.

Rays from external objects enter the multiband camera system 90B by passing through an opening in multiband camera system frame 263. Object rays first pass through common optical front end system 229, and then are applied to image splitter device 235. Some object rays emerging from optical front end 229 pass without changing direction through transparent section 210 of the image splitter device 235, and form a first object image 247 on first sensor 137. Rays from alignment assembly 225 are collimated and then applied to the alignment image splitter 288, which includes the transparent region 211 and the reflective region 205. Some rays from alignment assembly 225 pass, without changing direction, through transparent section 211, and form a first alignment assembly image 248 on the first sensor 137.

Other object rays emerging from optical front end system 229 strike a reflective section 143 of the image splitter device 235. Such rays are reflected by the reflective section 143, and their direction is changed so that they pass through optional corrective optics 233. Optional corrective optics 233 includes optical elements that change properties of rays and may improve their spatial spread, their chromatic variation, etc. Rays emerge from optional corrective optics 233 and form a second object image 245 on second sensor 139. Some rays from alignment assembly 225 strike the reflective section 205 of the alignment image splitter 288. Such rays are reflected by the reflective section 205, and their direction is changed so that they also pass through optional corrective optics 233. Rays emerge from optional corrective optics 233 and form a second alignment assembly image 246 on the second sensor 139.

The first object image 247, the second object image 245, the first alignment assembly image 248, and the second alignment assembly image 246 can be aligned and may be further electronically overlaid according to a user-preferred algorithm. The internal alignment system using the alignment image splitter 288 and the alignment assembly 225 insures image registration even when the sensors 137 and 139 are subject to relative motion due to, for example, vibrations, thermal conditions, etc. The first alignment assembly image 248 and the second alignment assembly image 246 can be used as zero points of reference when performing alignment of the first object image 247 to the second object image 245.

In general, the image splitter device 235 and the alignment image splitter 288 can be dichroic splitters, or systems of annular mirrors. The purpose of the image splitter device 235 and of the alignment image splitter 288 is to split the incoming object image and the incoming alignment assembly image into separate images for separate frequency bands, and to direct the separate images towards sensors 137 and 139. The sensors 137 and 139 have been described with reference to FIG. 2, and are appropriate for at least one of the frequency bands processed by multiband camera system 90B.

When the frequency bands are wide and have large inter-band separations (such as the visible and IR frequency bands), a preferred embodiment uses reflective annular mirrors, which provide efficient image splitting for the two frequency bands. By changing the ratio between the radius of the pass through hole transparent region 210 and the radius of the reflective region 143, and between the radius of the pass through hole transparent region 211 and the radius of the reflective region 205, the amount of light reaching each of the two sensors can be changed. The sensitivity of each of the two sensors also influences the amount of light required to form an image.

Optical materials may exhibit a significant amount of dispersion. Hence, the lengths of the optical paths for the two optical paths in multiband camera system 90B may be different for different frequency bands. For some applications, the optional corrective optics system 233 may be needed to balance the optical paths from an external imaged object to the various sensors (137, 139). In a preferred embodiment, the image splitter device 235 and the alignment image splitter 288 are integrated into one device, to obtain a better alignment.

Figure 4A:
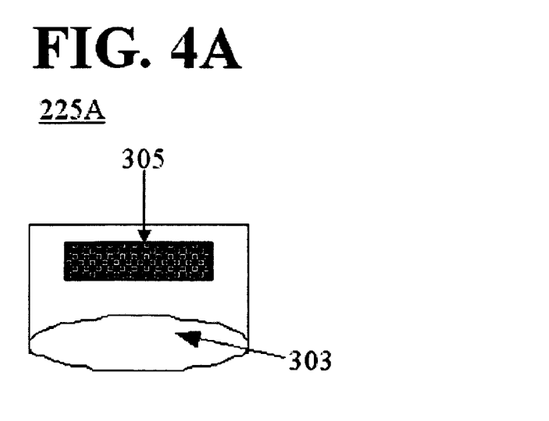
FIG. 4A illustrates an exemplary configuration for an internal alignment assembly for use in a multiband camera system according to an embodiment of the present invention illustrated in FIG. 3.

FIG. 4A illustrates an exemplary configuration for an internal alignment assembly 225A for use in a multiband camera system 90B according to an embodiment of the present invention illustrated in FIG. 3. FIG. 4A illustrates an exemplary structure for an alignment assembly 225A that includes LEDs.

The alignment assembly 225A comprises an alignment image array 305 that includes LEDs, and local miniature optics 303. The local miniature optics 303 may be a system of optical elements, composed of, for example, one or more lenses. The local miniature optics 303 and the alignment image splitter 288, comprising transparent region 211 and reflective region 205 as illustrated in FIG. 3, are designed to form an image of the alignment image array 305 on all sensors of multiband camera system 90B (137 and 139 in FIG. 3, but more may be present), with a granularity of roughly one sensor image pixel.

The alignment image array 305 may include a single pixel able to emit radiation across all bandwidths of all the sensor arrays such as 137 and 139. The alignment image array 305 may also include a number of co-located, adjacently located, or grouped pixels, each pixel or group of pixels emitting radiation in one of the bands of the sensors, together covering all sensors. The image array 305 may also display a calibration pattern.

Figure 4B:
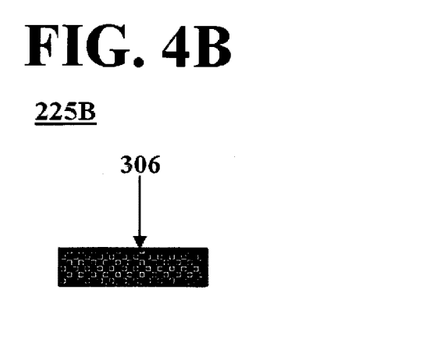
FIG. 4B illustrates another exemplary configuration for an internal alignment assembly for use in a multiband camera system according to an embodiment of the present invention illustrated in FIG. 3.

FIG. 4B illustrates another exemplary configuration for an alignment assembly 225B for use in a multiband camera system 90B according to an embodiment of the present invention illustrated in FIG. 3. The alignment assembly 225B includes an alignment image array 306 that includes one or more laser diodes. No local optics are needed with a laser diode, due to the coherent and directional nature of laser light.

Figure 4C:
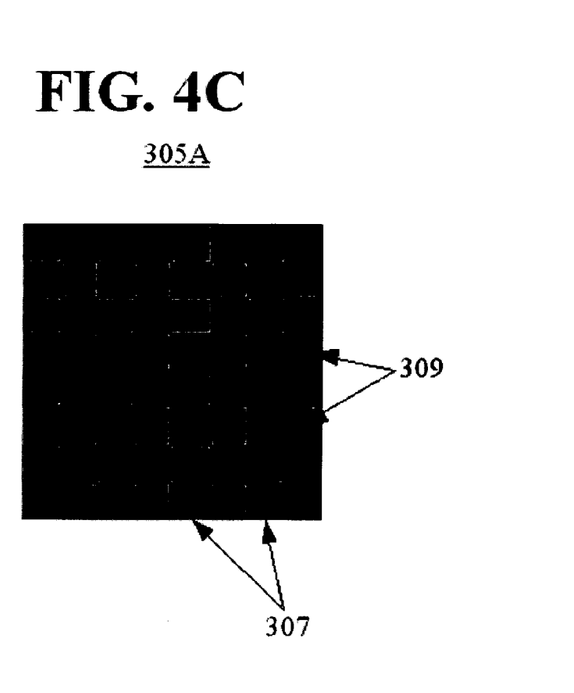
FIG. 4C illustrates an exemplary alignment image array for an internal alignment assembly for use in a multiband camera system according to an embodiment of the present invention illustrated in FIG. 4A.

FIG. 4C illustrates an exemplary alignment image array 305A for an alignment assembly 225A for use in a multiband camera system 90B according to an embodiment of the present invention illustrated in FIG. 4A. In one exemplary embodiment, the alignment pattern for an alignment image array 305A illustrated in FIG. 4A may include interleaved visible LEDs 309 and IR LEDs 307. The pattern of the alignment image array 305A is projected on both sensors 137 and 139, to form a first alignment assembly image 248 and a second alignment assembly image 246 as illustrated in FIG. 3.

Figure 4D:
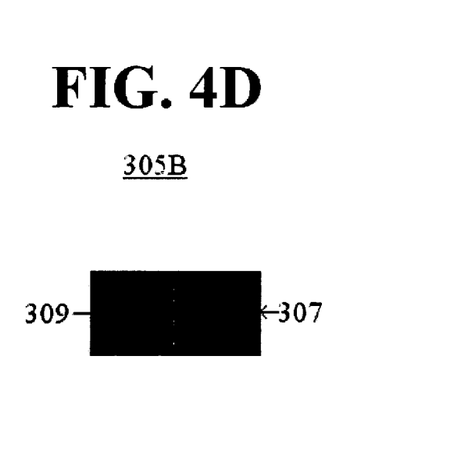
FIG. 4D illustrates another exemplary alignment image array for an internal alignment assembly for use in a multiband camera system according to an embodiment of the present invention illustrated in FIG. 4A.

FIG. 4D illustrates another exemplary alignment image array 305B for an alignment assembly 225A for use in a multiband camera system 90B according to an embodiment of the present invention illustrated in FIG. 4A. In another exemplary embodiment, the alignment pattern for an alignment image array 305B may include two co-located visible (309) and IR (307) LEDs. Local miniature optics (not shown) may be used in this embodiment. The pattern of the alignment image array 305B is projected on both sensors 137 and 139, to form a first alignment assembly image 248 and a second alignment assembly image 246 as illustrated in FIG. 3.

It is useful for the operation of multiband camera system 90B that the projected images of the alignment patterns (such as images 248 and 246 in FIG. 3) be easily located within each array of images. In other words, in a set of images including first object image 247, second object image 245, first alignment assembly image 248, and second alignment assembly image 246, it is useful to be able to identify that image 248, for example, is an image of the alignment assembly 225.

To make identification and localization of alignment assembly images easy within one frame period, the alignment image array 305 or 306 may be turned ON-OFF-ON-OFF . . . etc., from frame to frame. The ON and OFF states of the LEDs/laser diode in the alignment image array 305/306 are synchronized with the reading of the images on sensors 137 and 139. If the sensors 137 and 139 are "genlocked" in this manner to the timing of the alignment image array 305/306 turn-on and turn-off, the calibration images 248 and 246 can be found by subtracting a current frame form a previous (stored) frame of multiband camera system 90B. Once located, the pixel and line counts corresponding to the positions of the alignment image array 305/306 on the different sensors (such as 137 and 139) can be used to align the external object images 245, 247. This is done by setting the pixel and line counts of a predetermined reference point on sensors 137 and 139 to the corresponding pixel and line counts of the detected alignment patterns on sensors 137 and 139. In this way, automatic image alignment is achieved without substantial processing overhead, and with no latency. With this alignment method, camera realignment can be performed for every frame, hence accommodating even the most demanding applications.

Least overhead is required by an alignment assembly 225 with a single pixel alignment pattern. In some cases however, a single pixel is not sufficient to account for image twisting. To account for image twisting, two or three pixels in the alignment pattern 305/306 may be used, for 2D or 3D compensation.

Figure 5A:
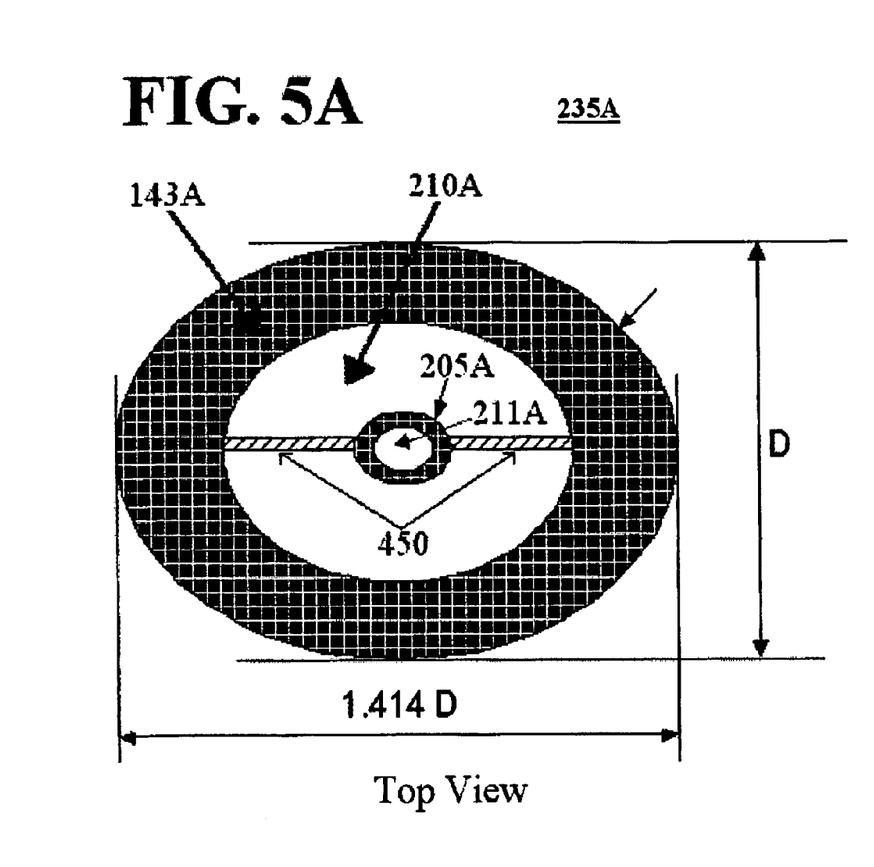
FIG. 5A illustrates an exemplary annular mirror splitter configuration for a splitter device for use in a multiband camera system according to an embodiment of the present invention illustrated in FIG. 3.

FIG. 5A illustrates an exemplary annular mirror splitter configuration for a splitter device 235A for use in a multiband camera system according to an embodiment of the present invention illustrated in FIG. 3. The alignment image splitter 288A may be implemented as an integral part of the object image splitter 235A, as seen in FIG. 5A. The image splitter device 235A includes transparent region 210A and reflective region 143A. Alignment image splitter 288A includes transparent region 211A and reflective region 205A. The reflective regions 143A and 205A may be mirror surfaces. The reflective region 205A can be supported by center mirror supports 450.

Figure 5B:
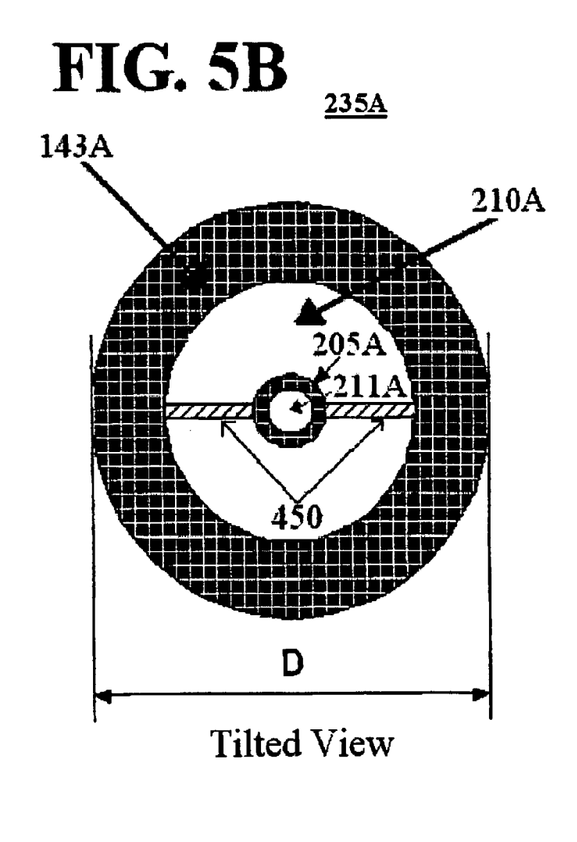
FIG. 5B illustrates a tilted view of an exemplary annular mirror splitter configuration for a splitter device for use in a multiband camera system according to an embodiment of the present invention illustrated in FIG. 5A.

FIG. 5B illustrates a tilted view of the exemplary annular mirror splitter configuration for splitter device 235A for use in a multiband camera system 90B according to an embodiment of the present invention illustrated in FIG. 5A. The splitter device 235A may be tilted with respect to incoming rays from external objects and from alignment assembly 225, as illustrated in FIG. 3. FIG. 5B illustrates the tilted view of the exemplary annular mirror splitter configuration for splitter device 235A when the splitter device 235A is tilted by 45°.

Figure 6:
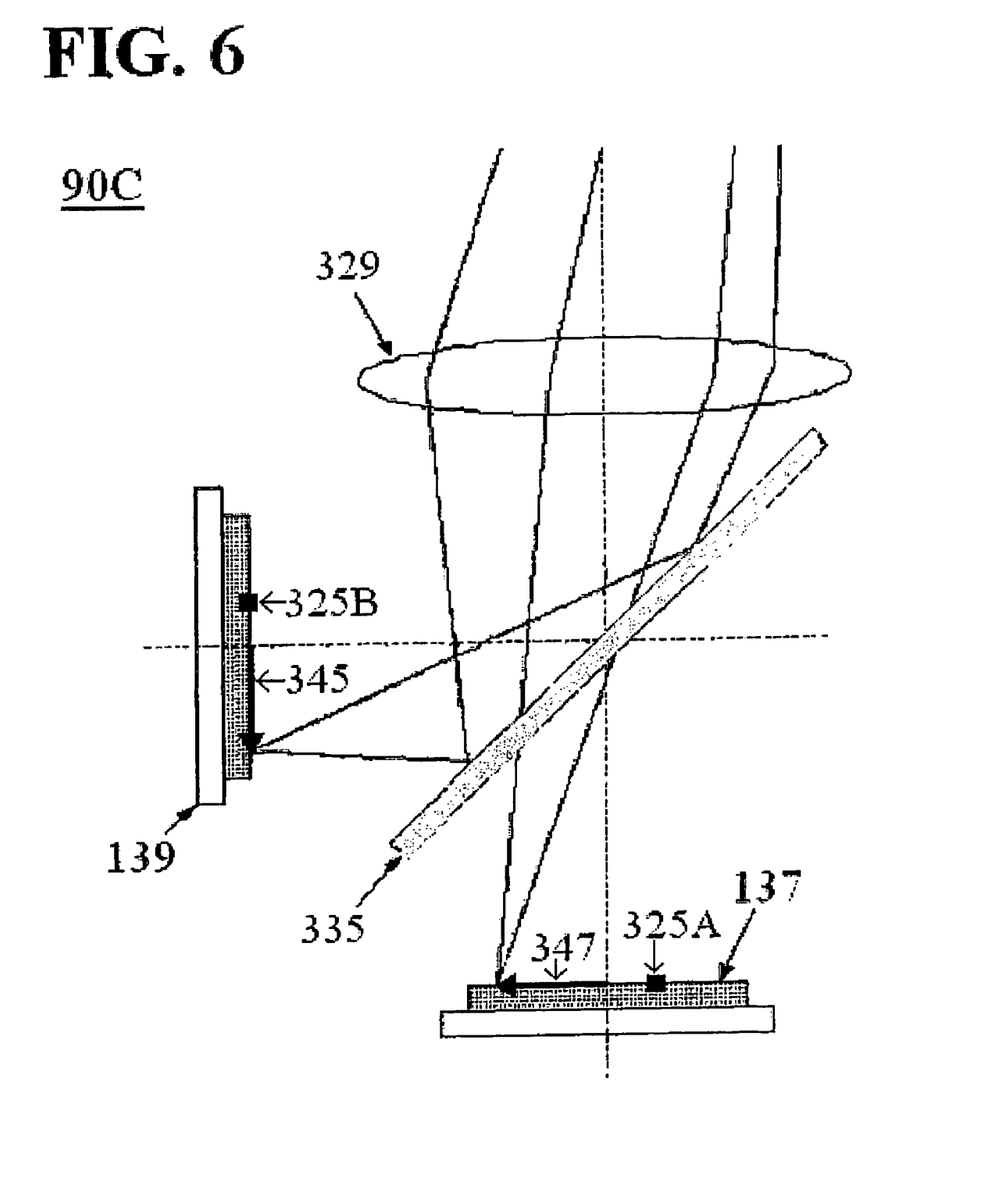
FIG. 6 illustrates a configuration for a multiband camera system including an alignment system localized on sensors according to another embodiment of the present invention.

FIG. 6 illustrates a configuration for a multiband camera system 90C including an alignment system localized on sensor arrays according to another embodiment of the present invention. As shown in FIG. 6, the multiband camera system 90C according to this embodiment includes: an optical front end system 329; a bi-directional optical splitter 335; a first sensor 137; a second sensor 139; and internal alignment elements 325A and 325B (collectively an "internal alignment system").

The multiband camera system 90C illustrated in FIG. 6 creates images 347 and 345 of an external object on first sensor 137 and on second sensor 139, using the bi-directional optical splitter 335. The bidirectional optical splitter 335 may split the incoming object image into separate images for separate frequency bands. The internal alignment element 325A is located on the first sensor 137, and the internal alignment element 325B is located on the second sensor 139. Although the internal alignment elements 325A and 325B shown in FIG. 6 are laser diodes, and therefore do not include imaging optics, other alignment elements may be used which do require imaging optics, such as LEDs and markers. In this embodiment, the first sensor 137 generates an alignment image of the internal alignment element 325B located on the second sensor 139, and the second sensor 139 generates an alignment image of the internal alignment element 325A located on the first sensor 137.

The multiband camera systems and methods described in this application can image most visible, SWIR, IR and thermal sensors bandwidths, with the use of appropriate sensors. By employing separate sensors (such as 137 and 139), the multiband camera systems described in this application can be built using components from different manufacturers; hence the multiband camera systems described in this application are commercial off-the-shelf (COTS) friendly. The multiband camera systems described in this application can tailor different designs for different applications, while providing a level of performance superior to single sourced "compound sensor" cameras.

By placing sensors in the multiband camera systems described in this application at different locations inside the camera, appropriate optical paths are achieved for each bandwidth imaged by the multiband camera system. Multiple images obtained on the separate sensors can then be electronically overlaid according to a user-preferred algorithm. An internal alignment system is used in the multiband camera system, to enable accurate image registration even when the sensors are subject to relative motion due to, for example, vibrations, thermal conditions, etc. Image alignment can be done for every image frame, with zero latency.

Although detailed embodiments and implementations of the present invention have been described above, it should be apparent that various modifications are possible without departing from the spirit and scope of the present invention.

I claim:

1. A multiband camera system, said system comprising:
   a first sensor for generating a first object image and a first alignment image in a first frequency band;
   a second sensor for generating a second object image and a second alignment image in a second frequency band;
   an internal alignment assembly; and
   a splitter for directing radiation in said first frequency band from said object to said first sensor to form said first object image, directing radiation in said second frequency band from said object to said second sensor to form said second object image, directing radiation in said first frequency band from said internal alignment assembly to said first sensor to form said first alignment image, and directing radiation in said second frequency band from said internal alignment assembly to said second sensor to form said second alignment image
   wherein said first alignment image and said second alignment image establish a reference for aligning the first and second object images.

2. The multiband camera system according to claim 1, wherein
   said internal alignment assembly is sequentially turned on and off,
   said first alignment image is located by comparing successive images formed on said first sensor, and
   said second alignment image is located by comparing successive images formed on said second sensor.

3. The multiband camera system according to claim 2, wherein the internal alignment assembly is turned on and off in synchronized fashion with a read-out timing of said first and second sensors.

4. The multiband camera system according to claim 1, wherein
   said first and second sensors are two-dimensional sensor arrays, and
   read-out from said first and second sensors is adjusted as a function of said first and second alignment images to automatically align said first object image with said second object image.

5. The multiband camera system according to claim 1, wherein said splitter device includes at least one of a dichroic region and an annular mirror.

6. The multiband camera system according to claim 1, wherein said splitter device includes
  an image splitter for directing radiation in said first frequency band from said object to said first sensor, and directing radiation in said second frequency band from said object to said second sensor, and
  an alignment image splitter for directing radiation in said first frequency band from said internal alignment assembly to said first sensor, and directing radiation in said second frequency band from said internal alignment assembly to said second sensor.

7. The multiband camera system according to claim 6, wherein
  said image splitter includes at least one of a dichroic region and an annular mirror, and
  said alignment image splitter includes at least one of a dichroic region and an annular mirror.

8. The multiband camera system according to claim 1, further comprising:
  an optical front end for processing said radiation from said object, before said radiation from said object reaches said splitter device.

9. The multiband camera system according to claim 1, further comprising:
  a corrective optics system for modifying optical paths for said radiation in said second frequency band from said internal alignment assembly and said radiation in said second frequency band from said object, before said radiation in said second frequency band from said internal alignment assembly and said radiation in said second frequency band from said object reach said second sensor.

10. The multiband camera system according to claim 1, wherein
  said first frequency band is a visible frequency band, and said second frequency band is an infrared frequency band.

11. The multiband camera system according to claim 1, wherein said internal alignment assembly comprises an alignment image array.

12. The multiband camera system according to claim 11, wherein said alignment image array comprises an array of LEDs.

13. The multiband camera system according to claim 11, wherein said alignment image array includes a plurality of pixels co-located, adjacently located, or grouped, each pixel in said plurality of pixels emitting radiation across only one of a bandwidth of said first sensor and a bandwidth of said second sensor.

14. The multiband camera system according to claim 11, wherein
  said alignment image array includes a plurality of interleaved visible and infrared LEDs.

15. The multiband camera system according to claim 1, wherein
  said internal alignment assembly comprises at least one laser diode emitting in said first frequency band and at least one laser diode emitting in said second frequency band.

16. A multiband camera system according to claim 1, wherein
  said alignment assembly includes: at least one alignment element positioned on said first sensor and at least one alignment element positioned on said second sensor.

17. A method for multiband operation of a camera system, said method comprising:
  directing radiation in a first frequency band from an object and an internal alignment assembly to a first sensor;
  directing radiation in a second frequency band from said object and said internal alignment assembly to a second sensor;
  generating a first object image and a first alignment image in said first frequency band on said first sensor;
  generating a second object image and a second alignment image in said second frequency band on said second sensor; and
  aligning said first and second object images using said first and second alignment images.

18. The method for multiband operation of a camera system as recited in claim 17, further comprising:
  sequentially turned on and off said internal alignment assembly;
  comparing successive images formed on said first sensor to locate said first alignment image; and
  comparing successive images formed on said second sensor to locate said second alignment image.

19. The method for multiband operation of a camera system as recited in claim 17, further comprising:
  adjusting read-out from said first and second sensors as a function of said first and second alignment images to automatically align said first object image with said second object image.

20. The method for multiband operation of a camera system as recited in claim 18, wherein the internal alignment assembly is turned on and off in synchronized fashion with a read-out timing of said first and second sensors.

* * * * *